(12) United States Patent
Lippert et al.

(10) Patent No.: US 9,410,794 B2
(45) Date of Patent: Aug. 9, 2016

(54) LIGHT MICROSCOPE AND MICROSCOPY METHOD FOR EXAMINING A MICROSCOPIC SPECIMEN

(71) Applicant: Carl Zeiss Microscopy GmbH, Jena (DE)

(72) Inventors: Helmut Lippert, Jena (DE); Nils Langholz, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 75 days.

(21) Appl. No.: 14/499,344

(22) Filed: Sep. 29, 2014

(65) Prior Publication Data

US 2015/0090908 A1    Apr. 2, 2015

(30) Foreign Application Priority Data

Sep. 30, 2013   (DE) .......................... 10 2013 016 368

(51) Int. Cl.
*G01B 11/02* (2006.01)
*G01B 9/04* (2006.01)
(Continued)

(52) U.S. Cl.
CPC  *G01B 11/02* (2013.01); *G01B 9/04* (2013.01); *G01B 11/0608* (2013.01); *G01B 11/24* (2013.01); *G01B 2210/52* (2013.01)

(58) Field of Classification Search
CPC ..... G02B 21/002; G02B 21/008; G02B 21/18
USPC ........ 250/234, 201.3; 359/385, 391; 356/601, 356/614, 625
See application file for complete search history.

(56) References Cited

U.S. PATENT DOCUMENTS

| 5,248,876 A | 9/1993 | Kerstens et al. |
|---|---|---|
| 6,674,572 B1 | 1/2004 | Scheruebl et al. |

(Continued)

FOREIGN PATENT DOCUMENTS

| DE | 19713362 A1 | 10/1998 |
|---|---|---|
| DE | 10242373 A1 | 4/2004 |

(Continued)

OTHER PUBLICATIONS

Search Report for German Application No. 10 2013 016 368.4, Feb. 6, 2014, 5 pages.

(Continued)

*Primary Examiner* — Kevin Pyo
(74) *Attorney, Agent, or Firm* — LaBatt, LLC (57) ABSTRACT

Examination of a microscopic specimen is described. Height information for a respective plurality of lateral regions of the specimen is obtained from each of multiple specimen recordings, in which the height information of each specimen recording is limited to a respective height measurement range and the height measurement ranges of different specimen recordings are different. An overall image is calculated from the specimen recordings, in which overall image height information of the different specimen recordings is combined. Specimen recordings are recorded at such heights that: the height measurement ranges of different specimen recordings overlap each other, common lateral regions are identified in two respective specimen recordings for which lateral regions height information could be obtained in both specimen recordings, and a link of the height information of different specimen recordings is determined on the basis of the height information of different specimen recordings for at least one common lateral region.

20 Claims, 6 Drawing Sheets

(51) Int. Cl.
  *G01B 11/06* (2006.01)
  *G01B 11/24* (2006.01)

(56) References Cited

U.S. PATENT DOCUMENTS

| | | | |
|---|---|---|---|
| 7,715,021 B2 * | 5/2010 | Winterot | G02B 21/0064 356/607 |
| 8,599,372 B2 * | 12/2013 | Chen | G02B 21/0032 356/300 |
| 2004/0051879 A1 | 3/2004 | Schick | |
| 2009/0153878 A1 | 6/2009 | Fujii | |
| 2013/0120539 A1 | 5/2013 | Foelling | |

FOREIGN PATENT DOCUMENTS

| | | |
|---|---|---|
| DE | 102011055294 A1 | 5/2013 |
| EP | 2314982 A1 | 4/2011 |
| WO | 2013070287 A1 | 5/2013 |

OTHER PUBLICATIONS

Search Report for Great Britain Application No. 1416698.7, Mar. 3, 2015, 1 page.

* cited by examiner

LIGHT MICROSCOPE AND MICROSCOPY METHOD FOR EXAMINING A MICROSCOPIC SPECIMEN

REFERENCE TO RELATED APPLICATIONS

The current application claims the benefit of German Patent Application No. 10 2013 016 368.4, titled "Light microscope and microscopy method for examining a microscopic specimen," which was filed on 30 Sep. 2013, and which is hereby incorporated by reference.

TECHNICAL FIELD

The present invention relates in a first aspect to a microscopy method for examining a microscopic specimen.

In a second aspect the invention relates to a light microscope for examining a microscopic specimen.

BACKGROUND ART

An aim of known light microscopes and microscopy methods is to determine the height of a specimen surface. The specimen surface can be understood on the one hand to be the outer boundary of an object to be examined. However, it can also be understood to be the surface of an inner part of the object to be examined, for example biological cells or cell components in an aqueous solution. Such measurements are relevant in particular for characterising technical surfaces and for deriving roughness measurement values and topographies.

The aforementioned height determination is possible with a generic microscopy method for examining a microscopic specimen. It is provided in this method that illuminating light is emitted with a light source device to the specimen, that specimen light coming from the specimen is guided with optical imaging means to a detector unit, that the specimen light is measured with the detector unit to produce a plurality of specimen recordings, that height information for a respective plurality of lateral regions of the specimen is obtained from each specimen recording, wherein the height information of each specimen recording is limited to one height measurement range in each case and the height measurement ranges of different specimen recordings differ from each other, and that an overall image is calculated from the specimen recordings, in which overall image height information of the different specimen recordings is brought together.

A generic light microscope for examining a microscopic specimen comprises a light source device to emit illuminating light to the specimen, optical imaging means to guide illuminating light to the specimen and to guide specimen light coming from the specimen, a detector unit to measure the specimen light to produce a plurality of specimen recordings, electronic control and evaluation means which are designed to obtain from each specimen recording height information for each of a plurality of lateral regions of the specimen, wherein the height information of each specimen recording is limited to one height measurement range in each case and the height measurement ranges of different specimen recordings differ from each other, and wherein the electronic control and evaluation means are additionally designed to calculate an overall image from the specimen recordings, in which overall image height information of the different specimen recordings is brought together.

Bringing together the height information of different specimen recordings can be understood in that the height information of one specimen recording is no longer provided independently of the height information of further respective specimen recordings, but instead the height information of each of the specimen recordings is expressed relative to a common reference point. Height information of one specimen recording can thereby be meaningfully compared with height information from another specimen recording.

Height examinations with confocal microscopes are known for example. In this case, the specimen is scanned with illuminating light which is initially focussed onto a certain height plane. Meanwhile, a specimen image is recorded as the aforementioned specimen recording. This specimen image can for example be evaluated to ascertain whether a specimen region, that is to say a certain lateral region of the specimen, lies exactly in the illuminated height plane or is at a distance from it. The specimen is then moved with an adjustable specimen table in the height direction, that is to say: in the direction of the optical axis extending from the specimen to an objective of the light microscope. A second specimen image is then recorded and evaluated. The relationship between the height of a lateral region lying in the case of the first specimen image in the illuminated height plane and the height of another lateral region located in the case of the second specimen image in the illuminated height plane is now to be determined. For this purpose, the adjusting height is detected, by which the specimen is displaced in height between the recordings of the two images. Height information of two specimen recordings is then brought together through the knowledge of the adjusting height. A disadvantage here is that cost-intensive adjusting elements are required to determine this height with great precision.

In order to simultaneously examine a plurality of lateral regions, the spinning disc method with a Nipkow disc can be used in confocal microscopy. In this case, a disc is used which has a plurality of holes, through which a plurality of lateral regions are illuminated. By rotating the disc, a scan is carried out in a lateral direction. For specimen recordings with different height measurement ranges, a displacement of the specimen in the height direction is also required here and this must conventionally be determined via a high-precision actuator system.

In addition, vibrations or impacts can arise here, through which a height position of the specimen varies during the measurements. In most cases, expensive vibration-damping tables are therefore used.

The same problems arise in microscopy with structured illumination, wherein specimen images are usually produced for different lattice images and are taken into calculation to produce a high-resolution image.

Also in the case of a separate simultaneous recording of confocal and non-confocal light portions, a height displacement of the specimen must be carried out, whereby this is associated with high costs for precise adjusting units and undesirable vibration effects.

Furthermore, the chromatic confocal principle is known for obtaining height information. In this case, an optical element with chromatical effect is used, of which the refractive power is dependent upon wavelength. In this way, light can be focussed, in dependence upon its wavelength, onto different height planes. A broadband light source or a tunable light source with sequential confocal detection can be used. In dependence upon the intensity of light of different wavelengths, the height of a lateral region of the specimen can be concluded. A height measurement range is defined through the different focussing of light of different wavelengths. If the specimen has greatly differing heights which go outside of this height measurement range, the specimen must also be moved in the height direction in this measurement method.

This displacement distance must conventionally also be detected with precise adjusting means. In addition, vibrations of the specimen table, for example, have great disadvantageous effects upon the measurement result.

The same problems also exist in the case of nano-profilometry methods. Here, a specimen is positioned so that it is located in the ascending or descending flank of the axial response function of a wide-field confocal microscope. If the relative reflectivities of the different specimen lateral regions are known through a previous calibration step, the height profile can be directly determined. However, the height measurement range is limited, meaning that the specimen must often be displaced in the height direction and a further specimen recording is necessary. In order to link the height information of these different recordings, accurate knowledge of the height adjustment of the specimen is required.

There are numerous further measurement methods but which are respectively limited to one height measurement range and require a displacement of the specimen relative to the illumination and detection optical path. All these conventional methods have the disadvantages that a high-precision relative displacement of the specimen with cost-intensive adjusting elements is necessary and that the measurement results can nonetheless be greatly influenced by vibrations.

SUMMARY OF THE INVENTION

It can be regarded as an object of the invention to indicate a microscopy method and a light microscope, with which a specimen can be examined precisely and cost-effectively over a particularly large height range.

This object is achieved through the microscopy method for examining a microscopic specimen, wherein illuminating light is emitted with a light source device to the specimen, wherein specimen light coming from the specimen is guided with optical imaging means to a detector unit, wherein the specimen light is measured with the detector unit to produce specimen recordings, wherein height information for a respective plurality of lateral regions of the specimen is obtained from each specimen recording, wherein the height information of each specimen recording is limited to a respective height measurement range and the height measurement ranges of different specimen recordings are different from each other, and wherein an overall image is calculated from the specimen recordings, in which height information of the different specimen recordings is brought together, wherein specimen recordings are recorded at such heights that the height measurement ranges of different specimen recordings overlap each other, common lateral regions are identified in two respective specimen recordings, for which common lateral regions height information could be obtained in both specimen recordings, and a link between the height information of different specimen recordings is determined on the basis of the height information of different specimen recordings for at least one common lateral region.

This object is also achieved through a light microscope for examining a microscopic specimen, having a light source device to emit illuminating light to the specimen, optical imaging means to guide illuminating light to the specimen and to guide specimen light coming from the specimen, a detector unit to measure the specimen light to produce a plurality of specimen recordings, electronic control and evaluation means designed to obtain height information for a respective plurality of lateral regions of the specimen from each specimen recording, wherein the height information of each specimen recording is limited to a respective height measurement range, and the height measurement ranges of different specimen recordings are different from each other, and wherein the electronic control and evaluation means are additionally designed to calculate an overall image from the specimen recordings, in which overall image height information of the different specimen recordings is brought together, wherein the electronic control and evaluation means are adapted: to record specimen recordings at such heights that the height measurement ranges of different specimen recordings overlap each other, to identify common lateral regions in two respective specimen recordings, for which common lateral regions height information is obtained in both specimen recordings, and to determine a link of the height information of different specimen recordings on the basis of the height information of different specimen recordings for at least one common lateral region.

Advantageous variants of the microscopy method according to the invention and the light microscope according to the invention are the subject matter of the dependent claims and are additionally explained in the following description.

In the microscopy method of the abovementioned type it is provided according to the invention that specimen recordings are recorded at such heights that the height measurement ranges of different specimen recordings overlap each other, that common lateral regions are identified in two respective specimen recordings, for which height information could be obtained in both specimen recordings, and that a link between the height information of different specimen recordings is determined on the basis of the height information of different specimen recordings for at least one common lateral region.

In the light microscope of the abovementioned type, the electronic control and evaluation means are adapted according to the invention:

to record specimen recordings at such heights that the height measurement ranges of different specimen recordings overlap each other, to identify in two respective specimen recordings common lateral regions, for which height information is obtained in both specimen recordings, that is to say: to identify at least one common lateral region, for which height information can be obtained in both specimen recordings, of which lateral region the height thus lies within the height measurement range, and to determine a link between the height information of different specimen recordings on the basis of the height information of different specimen recordings for at least one common lateral region.

These steps can preferably be carried out automatically by the control and evaluation means.

A fundamental idea of the invention can be seen in that the height information of the different specimen recordings is brought together for the overall image by identifying in two respective specimen recordings common lateral regions, for which height information could be obtained in both specimen recordings, and by determining, via this height information of common lateral regions, a relationship of the height information of remaining lateral regions, for which height information could be obtained in only one of the two specimen recordings.

This idea of the invention is set out in detail below.

Height information can be obtained by evaluating each specimen recording. The height information constitutes, however, only relative indications which indicate height relationships of different lateral regions within the specimen recording. A relationship between height information of one specimen recording and the height information of another specimen recording is initially unknown.

Conventionally, precise adjusting means are used for this purpose to detect the height distance, by which the specimen has been displaced between two specimen recordings.

This is not required according to the invention. An essential idea of the invention can be seen in determining a link between the height information of different specimen recordings through information from the specimen recordings themselves. The specimen recordings are thus evaluated in such a way that a height adjustment of the specimen between different specimen recordings can be calculated.

For this, information must be contained in two respective specimen recordings, from which information it can be determined which measurement value, that is to say: which height information, characterises the same height of a specimen region. In order to achieve this, a relative displacement between the specimen and an illumination and detection optical path from one specimen recording to the next specimen recording may not be of any level desired. Instead, the relative displacement is exactly of such size that the specimen recordings are carried out at such heights that the height measurement ranges of two respective specimen recordings overlap each other. This is necessary in order that at least one coinciding lateral region of the specimen can be examined in two respective specimen recordings. The height of this lateral region can be used as a reference height. Height information is thus determined in both specimen recordings for the same lateral region. The height information of the two specimen recordings represents the same height of a specimen region, meaning that the same absolute height value can be assigned to them. The remaining height information of the specimen recordings constitutes relative information with respect to this reference or absolute height value. The remaining height information can thus also be converted to absolute height values. A link is thus produced between the height information of two specimen recordings.

An optional third specimen recording is in turn recorded at such a height that its height measurement range overlaps with that of one of the aforementioned specimen recordings. A common lateral region is then determined in these two specimen recordings and the height of said common lateral region is used as a support or reference value for the remaining height information of the third specimen recording.

A similar procedure is followed with all further specimen recordings possibly carried out.

According to a preferred variant of the invention, the link is realised as follows: For each specimen recording, the height information of one of the lateral regions is determined as a reference point for this specimen recording. Alternatively, an in principle arbitrary reference point is derived from the height information of a plurality of lateral regions. The height information obtained in a specimen recording for the different lateral regions is then expressed as relative heights with respect to the reference point of this specimen recording. For at least one of the lateral regions common to two specimen recordings, a difference is determined between the two relative heights which have been determined for this lateral region in the two specimen recordings. A height offset is then determined with the difference determined. This height offset can be equal to the difference. If a respective difference is determined for a plurality of common lateral regions, the height offset can be fixed as an average value of this difference. In order to link the height information of the two specimen recordings, finally, the relative heights of one of these specimen recordings is modified by the height offset. The relative heights thus obtained of the two specimen recordings thereby refer to the same reference point.

The height information is preferably selected as a reference point from the lateral region, for which measurement precision is at its highest. If for example the height information is determined through a monotone function of the light intensity for the associated lateral region, the highest measurement precision is that at which the signal-to-noise ratio of the light intensity for a lateral region is greatest.

The specimen recording can in principle be carried out in any desired way, provided that it contains height information over a height measurement range, that is to say: provided that different heights of the specimen surface can be kept apart from each other within a certain height range in the specimen recording.

A specimen recording can be formed by a single or a plurality of specimen images. Two specimen images are preferably recorded which constitute a specimen recording. No height adjustment is necessary to record these two specimen images, as will be described in more detail below. A larger height measurement range can thus be covered by a specimen recording.

A height measurement range can be for example 1 µm. If the specimen has greater height differences, no quantitative height information, or only very imprecise quantitative height information, can be obtained for lateral regions of the specimen which go beyond this 1 µm height measurement range.

The specimen light to be detected can be illuminating light propagating back from the specimen, in particular reflected or scattered illuminating light. The specimen light can, however, also be luminescent light, i.e., fluorescent or phosphorescent light, which is produced through excitation by means of the illuminating light.

The light source device used can in principle be of any design, provided that it emits illuminating light, for example visible, infrared or ultraviolet light, to the specimen. It can comprise one or a plurality of light source units, for example lasers or LEDs. A light spot pattern consisting of a plurality of light spots is preferably produced on the specimen with the light source device. For this, a plurality of light sources can be arranged one beside the other in a corresponding pattern. Alternatively, a light source can illuminate a mask, through which the light spot pattern is produced. The mask can be formed for example by pinholes or mirrors. An electronically adjustable micromirror array (DMD: digital mirror device) can also be used as a mirror. Other electronically activated light modulators can be used which can be based for example on switchable liquid crystal regions. A lattice can also be used as a mask. This lattice can be adjustable transversely and/or in the propagation direction of the light. In this way the number of different lateral regions that can be illuminated is increased. In addition, the height plane, into which the light spot pattern is sharply imaged, can be changed. The lattice can have a periodic structure with one or two lattice constants. Alternatively, the lattice can also have an irregular structure, whereby light spots of different dimensions are simultaneously produced.

Furthermore the light source device or the optical imaging means can also have a scanner, through which an illuminating light beam illuminates different lateral regions one after the other and thus produces the light spot pattern.

The light spots simultaneously illuminate lateral regions spaced apart from each other. In this way, a plurality of lateral regions of the specimen can be examined in a single specimen recording. Since at least one lateral region is always used as a reference to link the height information of different specimen recordings, it continues to be compulsorily necessary for a plurality of lateral regions to be examined in a specimen recording.

A lateral region can be understood to be a region of the specimen which is transverse, in particular perpendicular, to the height direction. The height direction can thereby be understood to be the direction of the optical axis from an objective of the light microscope to the specimen.

The overall image which is calculated from the plurality of specimen recordings comprises the coordinates in the two lateral directions and in the height direction of a plurality of lateral regions of the specimen. The overall image can accordingly be understood to be a 3D image.

A link between the height information of different specimen recordings is generally to be understood in that the height information of different specimen recordings is expressed relative to a common reference. Indeed, the specimen recordings initially provide height information for other respective reference points and it is not initially known how these different reference points relate to each other.

One and the same height value is preferably assigned to each of the lateral regions common to two specimen recordings in order to link these two specimen recordings. The two specimen recordings each contain height information for remaining lateral regions, for which height information could only be obtained in one of the two specimen recordings. The relationship of this height information to that of the common lateral region is known from the specimen recordings. The height information of the remaining lateral regions can therefore now be expressed relative to the aforementioned height value.

Common lateral regions are to be understood to be lateral regions of the specimen which at least overlap each other. They are preferably concentric and have the same shape. The lateral regions can be defined by the specimen surface respectively irradiated by a light spot. In this case, the size of the light spot can vary in the propagation direction of the light, meaning that the light spot produced on the specimen surface can differ in size for two different specimen recordings. The common lateral regions are thereby concentric and of the same shape, but have different sizes.

In order to link the height information of two specimen recordings, a height offset between the height measurement ranges of these specimen recordings can also be calculated by calculating a difference between the height information of different specimen recordings for a common lateral region and displacing the height information of one of these two specimen recordings by the height offset. For example, a first specimen recording can show that a lateral region has a height of 0.3 µm relative to an arbitrary reference point. A further specimen recording can show that the same lateral region has a height of 0.8 µm relative to another arbitrary reference point. A height offset between these specimen recordings is now determined as the difference: 0.8 µm–0.3 µm=0.5 µm. All the height information of one of the two specimen recordings is now displaced by 0.5 µm. The height information of the two specimen recordings is thereby expressed relative to the same reference point.

For each specimen recording, the lateral regions, of which the heights lie within the respective height measurement range, can usefully be determined and selected. Only the height information of these selected lateral regions is used to calculate the overall image. It can be determined whether a lateral region, for which a measurement value is recorded, lies within the height measurement range by determining for example whether this measurement value fulfils a specified signal quality, in particular being greater than a threshold value.

A height measurement range can thus be limited by a signal quality being adequate only at heights of lateral regions of the specimen which lie within the height measurement range. An adequate signal quality can be defined in particular by the signal-to-noise ratio exceeding a specified threshold value.

In a case, in which a plurality of common lateral regions are identified in two specimen recordings, the height information of all the common lateral regions is preferably used to determine the link of the height information of remaining lateral regions, for which height information could be obtained in only one of the two specimen recordings. A greater precision of the link can hereby be achieved.

For each of the common lateral regions, a difference between the height measurement ranges of the two specimen recordings can be calculated, whereby these differences can have negligibly different values as a result of measurement imprecisions. An average value can thus be formed from the differences. This average value is used as a height offset between the height measurement ranges of the two specimen recordings under observation.

When using the height information of a plurality of common lateral regions to link the height information, it can be provided to weight the height information for the plurality of common lateral regions differently. The weighting of height information can be realised for example in dependence upon the associated signal quality. If for example the height information is derived from a light intensity, the signal-to-noise ratio and hence the signal quality are better with greater light intensity. If the height information of a lateral region is determined from an image sharpness, the signal quality is better with greater image sharpness for measurement information of the respective lateral region.

In order to produce a plurality of specimen recordings, a height scan can be carried out. During a height scan, the height range of the specimen, from which specimen light is guided onto the detector unit, is adjusted for each specimen recording. To this end, the specimen can for example be adjusted in height. An optical path of illuminating and/or specimen light can also be adjusted relative to the specimen. When using a chromatic optical system which produces different foci for different light wavelengths, the different specimen recordings can also be produced through sequential emission of illuminating light of different wavelengths. This is also described as a Lambda scan.

According to a further embodiment of the invention, optical imaging means are provided for encoding height information, said optical imaging means having a point imaging function with which a form or shape, in which a point of a light source is imaged onto a lateral region of the specimen, or in which a lateral region of the specimen is imaged onto the detector unit, depends upon the height of the respective lateral region. In specimen recordings recorded with the detector unit the respective form or shape of the plurality of imaged lateral regions is then determined. Finally, height information of the respective lateral region is derived from the shape.

Such a point imaging function can be achieved for example through optical elements with astigmatism. For this purpose, in particular a cylindrical lens can be provided in the optical path between the specimen and the detector unit. A point-form or circular-shaped lateral region of the specimen is distorted by the cylindrical lens such that the width and length of the image on the detector unit are different from each other. The width and length of this image thereby depend upon the height of the imaged lateral region of the specimen. Height information can thus be derived from the width and length of the image.

Alternatively, the cylindrical lens can also be arranged between the light source device and the specimen, whereby a point-form or circular-shaped light source is imaged in a distorted way onto the specimen and the concrete shape depends upon the height of the illuminated lateral region. The shape of the illuminated region can then be measured with the detector unit, whereby no further cylindrical lens is required before said detector unit. In more general terms, any desired optical elements with astigmatism can be used in these embodiments instead of a cylindrical lens.

The optical imaging means can also comprise a so-called phase plate having a point imaging function which images a point spirally with a form dependence in the propagation direction of the specimen light, that is to say: in the height direction of the specimen.

According to these embodiments, each specimen recording can comprise exactly one specimen image.

According to preferred variants of the invention, the height information is obtained from a specimen recording through:
- an intensity determination, wherein height information for a lateral region is derived from a measured light intensity for this lateral region, such as for example in nano-profilometry, and/or
- a sharpness determination, wherein height information for a lateral region is derived from a determined image sharpness for this lateral region.

Alternatively, a coherence contrast or degree of coherence can also be determined which, in the same way as the light intensity and sharpness, is dependent upon the height of the respective lateral region. In addition, the arrival time of reflected photons of the illuminating light can also be detected in order to obtain height information.

Height information can also be determined from a specimen recording via interference of illuminating light and specimen light. For this, illuminating light is guided onto the specimen and specimen light coming from the specimen is guided in the direction of the detector unit. A portion of the illuminating light is branched off onto a reference path before this portion reaches the specimen, and it is brought into interference with the specimen light at the detector unit. The interference pattern or, respectively, a light intensity at certain detector regions, depends upon the height of the specimen, meaning that height information can be obtained. Such a specimen recording also has a limited height measurement range. It is thus a good idea to displace the specimen to an initially only imprecisely known different height and to calculate a link of the height information thus recorded in the manner according to the invention.

According to a further preferred embodiment, a chromatic confocal specimen examination or a white light interferometry is carried out to produce a specimen recording, from which height information can be obtained. In such cases, focal planes of illuminating light are wavelength-dependent. A plurality of light spots can thus be radiated onto different specimen regions with a confocal arrangement. By using, for example, a pinhole disc or a digital diaphragm, only specimen light from precisely these illuminated specimen regions is measured with the detector unit. Through a chromatically effective optical element, different confocal planes are produced for light of different wavelengths. The intensities of specimen light can be determined for each illuminated specimen region in dependence upon wavelength. By determining the wavelength, at which the intensity is maximal, it is possible to determine the confocal plane of the plurality of confocal planes, with which the height of the illuminated lateral region coincides.

The illuminating light can be emitted as white light which covers a spectrally broad range. In this case, the detector unit measures in a wavelength-resolved way. Alternatively, illuminating lights of different wavelength ranges can also be emitted one after the other. In this way, a wavelength resolution of the detector unit is unnecessary.

According to a further, particularly preferred embodiment, the optical imaging means, the light source device and the detector unit are designed in such a way that at least two specimen images can respectively be recorded for each specimen recording without mechanically moving the specimen, the optical imaging means or the detector unit. For the recording of the two specimen images:
- at least two light spot patterns are focussed into different specimen or height planes with the light source device and the optical imaging means and/or
- images of at least two different specimen planes are produced and separately measured with the optical imaging means and the detector unit.

According to these embodiments, a spatially equal arrangement is thus used to record the at least two specimen images. No scanning movement in the height direction is carried out between the recordings of these images. A speed advantage is thereby achieved. In addition, an improved precision is possible, since inaccuracies of mechanical movements are not present and vibrations of optical components have reduced effects. In addition, a specimen-dependent calibration is not necessary. Configurations of these embodiments are described in greater detail below.

The size of an illuminated specimen region or lateral region depends upon the height of the height plane, onto which a light spot is focussed, relative to this lateral region. In dependence upon the surface profile of the specimen, light spots of different sizes are thus produced on the specimen surface with one height plane.

In the case of a comparatively small illuminated lateral region, a correspondingly small region with high specimen light intensity is illuminated on the detector unit. On the other hand a larger illuminated lateral region leads to a comparatively large region with lower specimen light intensity being illuminated on the detector unit.

It can be determined from this which illuminated lateral regions lie inside or outside of the height plane, onto which the light spot pattern is focussed. It cannot yet be determined from a single specimen image without a specimen-specific reference measurement whether the lateral regions lying outside of the height plane are located above or below this height plane. This becomes possible with the aid of the second specimen image.

The light spot patterns can be focussed onto different height planes for the recordings of the two specimen images. The detector elements which record the two specimen images can thereby be located in the same image plane to record both the images. Whether a lateral region illuminated for the second specimen image is larger or smaller than the corresponding lateral region illuminated for the first specimen image depends upon whether the height of this lateral region lies above or below the first height plane, onto which the light spot pattern is focussed in the case of the first specimen image. It can thus be determined from a comparison of the measurement information obtained for the same lateral region in the two specimen images whether the height of this lateral region lies above or below the first height plane.

If on the other hand the measurement information of different, unequal lateral regions had to be compared, degrees of reflectivity and/or light scattering varying over the specimen would falsify the result.

Alternatively, an identical light spot pattern is produced on the specimen surface for the recording of the two specimen images, and different height planes are imaged onto the detector unit and separately measured. The detector unit accordingly records at least two specimen images, wherein a detector plane, in which the detector elements of the detector unit are located, is optically conjugated with a first height plane and a second height plane differing therefrom. The height plane, onto which the light spot pattern is focussed, can be identical to the first or second height plane or be different from both of them.

The above alternative can also be described as follows: A certain height plane on the specimen is imaged onto two spatially offset image planes. The two image planes are thus respectively optically conjugated with the height plane. The image planes lie differently with respect to the detector plane of the detection unit and are separately measured, whereby the two specimen images are recorded. The height plane is thus imaged with differing sharpness onto the detector plane. It is determined from a comparison of the measurement information obtained for the same lateral region in the two specimen images whether the height of this lateral region lies above or below the first height plane.

Quantitative statements are possible with the aid of previously stored reference data. These reference data may have been determined in a preceding reference measurement on an object with a known height profile. By comparing the image sharpnesses or light intensities it is possible to state, through the reference data, how far the height of the lateral region examined is from the two height planes.

In general a height plane is a flat surface but it can also be a curved or otherwise formed surface. This is the case for example with curved image sensors. More generally, a height plane can thus be understood to be a surface which is optically conjugated with a detector surface of the detector unit, or which is optically conjugated with a light spot pattern of the light source device which is to image the height plane on the specimen.

The light source device preferably comprises a first and at least a second light source unit to focus the light spot patterns onto different height planes. The first light source unit is thereby arranged in a plane which is optically conjugated with a first height plane on the specimen, and the second light source unit is arranged in a plane which is optically conjugated with a second height plane on the specimen. A spatially fixed arrangement can thus be used to produce light spot patterns in the different height planes.

The at least two light source units can be arranged one behind the other for a simple design. One and the same detector region of the detector unit, thus for example the same camera sensor elements, can thereby be used to record the at least two specimen images.

If the illuminating lights of the two light source units can be distinguished from each other, however, the at least two specimen images can also be simultaneously recorded.

In particular, to this end, the two light spot patterns which are focussed with the light source device and the optical imaging means into different image planes can differ in a light property. The specimen light is guided with beam splitting means in dependence upon its light property onto different optical paths, in each of which a specimen image is measured with the detector unit. The light property can for example be a polarisation or wavelength of the illuminating and specimen light. The beam splitting means can thus comprise a polarisation beam splitter and/or a dichroic element which reflect(s) or transmit(s) light in dependence upon the light polarisation or the light wavelength.

For a specimen recording, two specimen images can be recorded, wherein a light spot pattern is focussed onto one and the same height plane, but wherein different height planes are imaged onto the detector unit.

For this, beam splitting means can be present between the specimen and the detector unit, with which beam splitting means specimen light is divided across at least two spatially different detection optical paths. The detector unit comprises a respective detector region for each of the different detection optical paths. Different height planes are thereby imaged onto the different detector regions.

In other words, an image of the illuminated height plane is produced into a respective image plane in each of the detection optical paths with the specimen light, wherein the image planes of the different detection optical paths are produced in different planes relative to the respective detector region.

The two detector regions can be formed for example by different cameras. It is, however, particularly preferable for the different detector regions to be different portions of a joint camera, that is to say a shared camera chip.

According to a preferred embodiment, the beam splitting means are formed by a light-diffracting element, wherein the two detection optical paths are produced by different orders of diffraction of the light-diffracting element. A structure with a small number of components and hence low costs is thus hereby possible with particularly small light losses.

BRIEF DESCRIPTION OF THE DRAWINGS

Further advantages and features of the invention are described below by reference to the attached schematic drawing, in which.

The same components and those having the same effect are generally provided in the figures with the same reference signs.

DETAILED DESCRIPTION OF THE INVENTION

A fundamental idea of the invention will firstly be described by reference to FIGS. 1 to 3.

Figure 1:
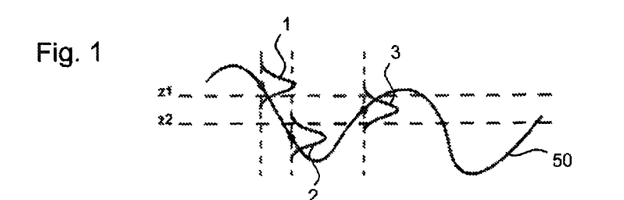
FIG. 1 shows, for the purpose of explaining the idea according to the invention, a specimen surface with three identified specimen points in different height planes.

FIG. 1 shows a cross-section through a specimen surface 50 perpendicularly to an optical axis. Three specimen points x1, x2 and x3 of the specimen surface 50 are identified, that is to say: three lateral regions of the specimen. These three specimen points have different heights, wherein a height direction extends in the indicated z-direction.

A so-called response curve 1, 2 and 3 is shown for each of the three specimen points x1, x2 and x3. The response curve indicates how high the signal strength of a specimen point is in dependence upon an examined height plane z1, z2. The level of the signal strength is thereby plotted in x-direction. The signal strength is at its highest if the examined height plane extends exactly through the specimen point. Corresponding to the response curve, however, a further signal of a specimen point is measured if the examined height plane lies at a negligible distance from this specimen point.

The physical property to be understood by the signal strength depends upon the measurement method. For example, the signal strength can be the light intensity, image sharpness or the coherence contrast.

When recording a specimen, height information can only be obtained from a limited height measurement range. This height measurement range depends upon the width of the response curves. FIG. 2 shows the specimen surface 50 of FIG. 1, wherein a first height measurement range 4 is shown. This height measurement range 4 is used for a first specimen recording. The height measurement range follows from an examination of the height plane z1, for which purpose, for example, a detector plane of the detector unit can be arranged in a plane conjugated with z1. The height measurement range can correspond exactly to the width of the response curves, wherein the width can be limited by whether the signal strength lies above or below a specified threshold value.

The heights of the first and third specimen point x1 and x3 lie within the height measurement range 4. Height information for these specimen points can thus be obtained from this specimen recording. On the other hand, the second specimen point x2 lies outside of the height measurement range 4, meaning that no height information, or only height information with insufficient accuracy, can be determined for the second specimen point x2.

Figure 2:
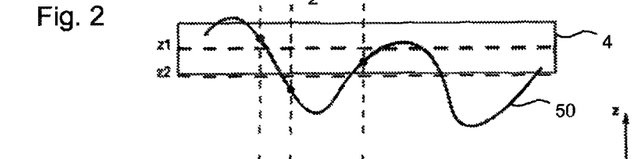
FIG. 2 shows the specimen surface with the three identified specimen points of FIG. 1, wherein a height measurement range is such that the heights of a first and a third specimen point can be measured.

FIG. 3 shows once again the specimen surface 50 of FIGS. 1 and 2, wherein a second height measurement range 5 is used for a second specimen recording, wherein the height plane z2 is examined. This height measurement range 5 is different from the first height measurement range 4. In order to bring about a change from the first to the second height measurement range, the specimen can for example be displaced in a height direction. The specimen points with the values x2 and x3, but not the specimen point with the value x1, lie within the height measurement range 5. Height information for x2 and x3, but not for x1, can thus be obtained.

The height information of the two specimen recordings is now to be brought together to create an overall image. However, a relationship between the two height measurement ranges of the two specimen recordings is not initially known.

The height information of different specimen recordings refers to different reference points. Such a reference point can for example be the lower limit of the height measurement ranges shown in FIGS. 2 and 3.

It can be determined for example with the first image recording from FIG. 2 that the lateral region x1 has a height value z1A of for example 0.8 μm relative to a reference point A and that the lateral region x3 has a height value z3A of for example 0.2 μm relative to the reference point A. It can correspondingly be determined with the second image recording of FIG. 3 that the lateral region x2 has a height value z2B of for example 0.3 μm relative to a reference point B and that the lateral region x3 has a height value z3B of for example 0.8 μm relative to the reference point B. It is not known, however, how the reference points A and B relate to each other.

Conventionally, the height, by which the specimen has been displaced for a transition from the first to the second height measurement range, is detected for this purpose with a precise actuator system or adjusting elements. This height adjustment represents the difference between the reference points A and B and is 0.6 μm in the above example. This difference of 0.6 μm can now be added to the height values z2B and z3B, whereby the height values of the two specimen recordings relate to the same reference point.

A disadvantage of this conventional method is that very precise and hence expensive adjusting elements are required for exact results. In addition, vibrations are not taken into consideration, through which an actual height of the specimen temporarily deviates from the height set by the adjusting element.

These problems are averted by the invention.

It is thus determined from the image recordings themselves how the reference points of the two specimen recordings relate to each other. In other words, the height difference between the reference points A and B is calculated with the recorded image information as a link between the height information of these specimen recordings.

For this purpose, use is made of the fact that height information can be obtained in both specimen recordings for a common lateral region x3. In the above example, this height information is z3A=0.2 μm and z3B=0.8 μm. Since this height information relates to the same lateral region, it also constitutes the same height value. The height difference between the reference points A and B can therefore be determined by the height information z3A and z3B, in the simplest case by the difference between this height information z3B−z3A=0.6 μm.

The value of 0.6 μm, thus determined, represents a link between the height information of the two specimen recordings.

No high-precision adjusting elements are advantageously required to adjust the height of the specimen. If for example less precise adjusting elements are used, which indicate a height adjustment of 0.4 μm+/−0.2 μm for the above example, a more accurate value can be determined by the method of the invention described above.

If an adjusted height is changed by a vibration of for example a specimen table holding the specimen, the recorded height information is based upon the changed height. In comparison with a height determination by means of adjusting elements, an interference effect of vibrations is accordingly extensively excluded.

It is necessary for the method of the invention that there is, in two specimen recordings, always at least one common lateral region, for which height information can be obtained in both specimen recordings. For this, a change in the height measurement range between the two specimen recordings must be smaller than the height measurement ranges themselves. The height measurement ranges of the two specimen recordings thereby overlap each other. A change in the height measurement range is thus realised between two specimen recordings which is smaller than the height measurement ranges, wherein the exact value of this change does not have to be detected by measurement sensors or adjusting elements.

It is additionally necessary for the method of the invention for equal lateral regions, and not lateral regions offset with respect to each other, to be measured in the two specimen recordings. To this end, light spots are produced on the same lateral regions for the two specimen recordings, so that specimen light is emitted from the same lateral regions.

A further requirement is that a plurality of lateral regions must be examined with each specimen recording. It is only in this way that two specimen recordings can comprise both common lateral regions and also remaining lateral regions, for which height information can be obtained in only one of the specimen recordings.

Figure 3:
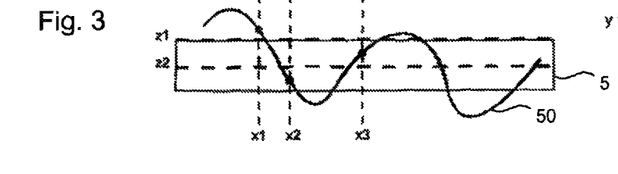
FIG. 3 shows the specimen surface with the three identified specimen points of FIG. 1, wherein a height measurement range is such that the heights of a second and the third specimen point can be measured.

In the example of FIGS. 1 to 3, a common lateral region x2 is identified, for which height information can be obtained with the two specimen recordings.

Figure 4:
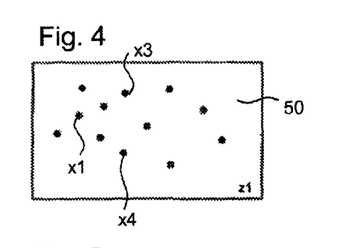
FIG. 4 shows a cross-section of the specimen, wherein the specimen points, for which height information can be determined in a first specimen recording, are identified.
Figure 5:
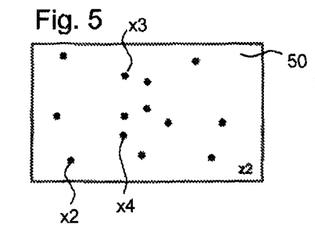
FIG. 5 shows the cross-section of the specimen of FIG. 4, wherein the specimen points, for which height information can be determined in a second specimen recording, are identified.

Another example is shown in FIGS. 4 and 5. FIG. 4 indicates the lateral regions of the specimen, for which height information can be obtained in the height plane z1 examined. The paper plane thereby corresponds to a lateral plane, that is to say: the height direction is perpendicular to the paper plane. Correspondingly, FIG. 5 shows the lateral regions of the specimen, for which height information can be obtained in the examined height plane z2. The common lateral regions, for which height information can be obtained in both cases, are shown in FIG. 6.

Figure 6:
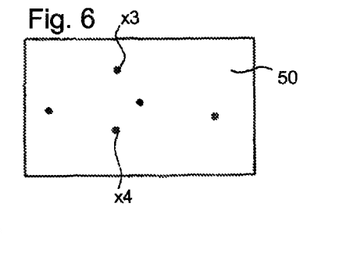
FIG. 6 shows the cross-section of the specimen of FIG. 4, wherein the specimen points, for which height information can be determined in both the first and also the second specimen recording, are identified.

All the height information obtained for the lateral regions shown in FIG. 6 is preferably used to link the height information of the two specimen recordings. For this purpose, a height difference can be determined for example for each of these lateral regions in the manner described above. An average value is then formed from the plurality of height differences determined and is used to link the height information of the two specimen recordings.

For the calculation of the average value, the plurality of height differences can be differently weighted, for example in dependence upon the signal-to-noise ratio of the associated measurement.

The type of specimen recording can in principle be arbitrary. It is advantageous, however, if height information can already be obtained over a large height range without the specimen height having to be adjusted with an actuator system. This is possible in advantageous embodiments of the invention which are explained having regard to FIGS. 7 to 10.

These figures show different structures of a detector unit 30 of a light microscope according to the invention. A common feature of these embodiments is that two different specimen images can be recorded without mechanical movements of, in particular, the specimen, the light source device, the detector unit and optical elements being necessary between them.

To this end, the detector unit comprises two detector regions differing spatially from each other, onto which, in all embodiments shown, different height planes, for example z1 and z2 from the preceding example, are imaged.

Figure 7:
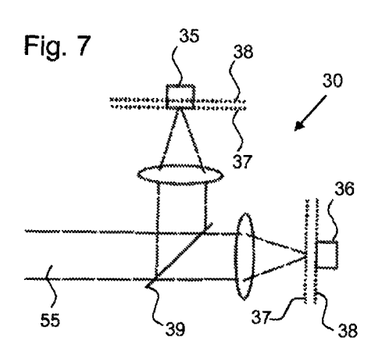
FIG. 7 shows components of an embodiment of a light microscope according to the invention, with which two different height planes of the specimen can be examined without mechanical movement of components.

In the example of FIG. 7, two detector regions are formed by two cameras 35, 36. The camera 35 is located in a detection plane 37 and the camera 36 in a different detection plane 38. Specimen light 55 to be detected is divided with beam splitting means 39 between two different detection optical paths to the two cameras 35, 36. The beam splitting means can for example be a partially permeable mirror.

Figure 8:
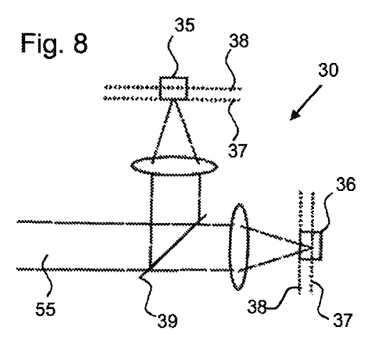
FIG. 8 shows components of a further embodiment of a light microscope according to the invention, with which two different height planes of the specimen can be examined without mechanical movement of components.

In the embodiment of FIG. 8, illuminating light of different wavelengths is used. The specimen light propagating back can be reflected or scattered illuminating light and can thus have the same wavelengths as the illuminating light. In this case a dichroic element can be used as beam splitting means 39, which, in dependence upon the wavelength, either reflects specimen light to the camera 35 or transmits it to the camera 36. The imaging optical systems for the two cameras are different or have focal lengths which are different in dependence upon the wavelength. In this way, the two cameras 35, 36 can also be arranged optically conjugated with two different specimen planes.

Figure 9:
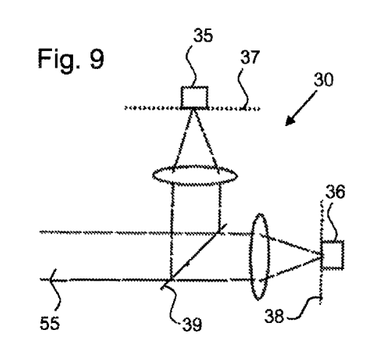
FIG. 9 shows components of yet a further embodiment of a light microscope according to the invention, with which two different height planes of the specimen can be examined without mechanical movement of components.

FIG. 9 shows an embodiment, wherein a chromatically effective optical element (not shown) is used. This has focal lengths which differ in dependence upon wavelength. Different specimen planes can thereby be examined with illuminating light of different wavelengths. The specimen light propagating back can have the same wavelength. A dichroic element is used here as beam splitting means 39, which, in dependence upon the wavelength, either reflects specimen light to the camera 35 or transmits it to the camera 36. The two cameras 35, 36 are in turn located in detection planes 37, 38 which are optically conjugated with two different specimen planes for the respectively measured light wavelength.

Figure 10:
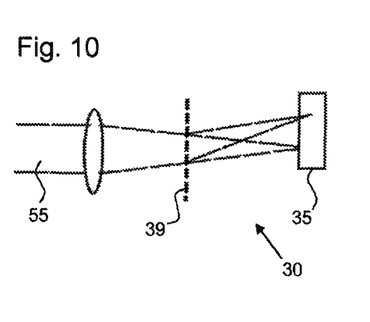
FIG. 10 shows components of a further embodiment of a light microscope according to the invention, wherein two different height planes of the specimen can be simultaneously examined through a light-diffracting element.

A further embodiment is shown in FIG. 10, wherein the two detector regions are formed by portions of the same camera 35 lying one beside the other. For beam-splitting of the specimen light 55, a diffractive element 39 is used which has different focal lengths in dependence upon the order of diffraction. If specimen light 55 is diffracted into different orders of diffraction and is respectively detected with the camera 35, two specimen images can be simultaneously produced. On account of the different focal lengths of the orders of diffraction, these two specimen images correspond in turn to different specimen planes.

If two specimen images are recorded in one of the ways shown in FIGS. 7 to 10, height information can be obtained from these images without a new calibration measurement being required for each specimen. In order to obtain height information, the recorded data of the specimen images are taken into calculation. A light intensity for each specimen image can respectively be determined for the different lateral regions. A ratio of the two light intensities of the two specimen images for the same lateral region can then be respectively determined. These ratios represent a monotone image of the height. The ratios can also be divided by the ratio which has been determined for a certain lateral region. In principally the same way, instead of the light intensity, a sharpness of the corresponding image portion can also be determined and used for each lateral region.

Figure 11:
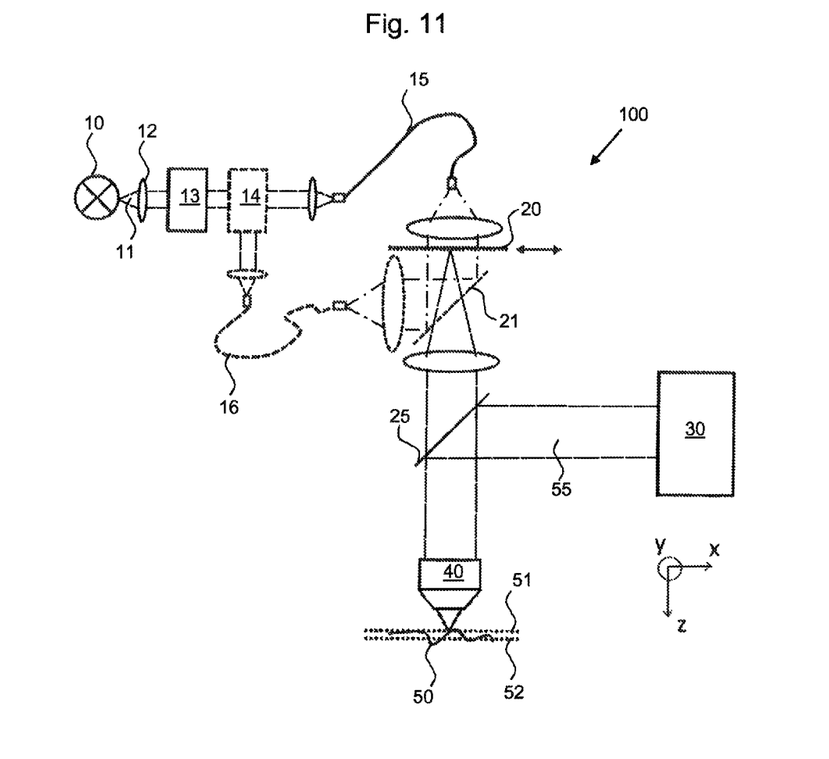
FIG. 11 shows a first embodiment of a light microscope according to the invention.

An embodiment of a light microscope 100 according to the invention is shown in FIG. 11. This comprises, as its essential components, a light source device 10, optical imaging means comprising an objective 40, and a detector unit 30.

In a simple design, the elements 13, 14, 15, 16, 20 and 21 described below can be omitted.

In the example shown, illuminating light 11 emitted by the light source device 10 is guided over optical elements 12 to a wavelength filter 13. This wavelength filter 13 can be designed for example acousto-optically and facilitates a selection of the wavelength portion of the illuminating light 11 which is to be forwarded.

Subsequently the illuminating light 11 reaches an optionally provided switching element 14, through which illuminating light 11 is guided electively onto one of two optical paths 15, 16. The illuminating light 11 is guided on the two optical paths 15, 16 via, for example, optical fibres and an optional switching element 21, which can also be replaced by a partially permeable mirror, onto different sides of an illuminating structure 20. The illuminating structure 20 imprints a spatial structure on the illuminating light 11 over its cross-section. For example the illuminating structure 20 can be a lattice.

The illuminating structure 20 is mirrored on one side, so that illuminating light 11 from the optical path 16 is at least partially reflected at the illuminating structure 20, while illuminating light 11 from the optical path 15 is at least partially transmitted at the illuminating structure 20. The two portions of the illuminating light 11 are thereby brought together onto a common optical path and then guided to an objective 40. The illuminating light 11 is focussed with the objective 40 onto a height or specimen plane 51 in the region of the specimen 50. The illuminating structure is preferably located in a plane optically conjugated with the specimen plane 51, so that it is sharply imaged into the specimen plane 51.

If a plurality of specimen recordings are recorded one after the other, wherein the position of the illuminating structure 20 is changed in the lateral direction, it is possible under certain circumstances to also omit the elements 14, 16 and 21 as well as the mirroring of the illuminating structure.

Through the illumination of the specimen 50, the latter emits specimen light 55 which is recorded with the objective 40. Beam splitting means 25 are arranged between the objective 40 and the illuminating structure 20, with which beam splitting means 25 the specimen light 55 is guided not to the illuminating structure 20 but instead to the detector unit 30. The detector unit 30 can be designed in one of the ways shown in FIGS. 7 to 10 and produce a specimen recording. Electronic control and evaluation means (not shown) carry out the evaluation of the specimen images recorded.

It is possible to examine different height planes one after the other and to record a respective specimen image with a tunable light source device 10 according to the chromatic confocal principle.

The specimen 50 can also be adjusted in the height direction for different specimen recordings.

In FIG. 11, two height planes 51 and 52 are indicated on the specimen 50. These can be planes conjugated with the planes 37 and 38 of FIGS. 7 to 10.

Figure 12:
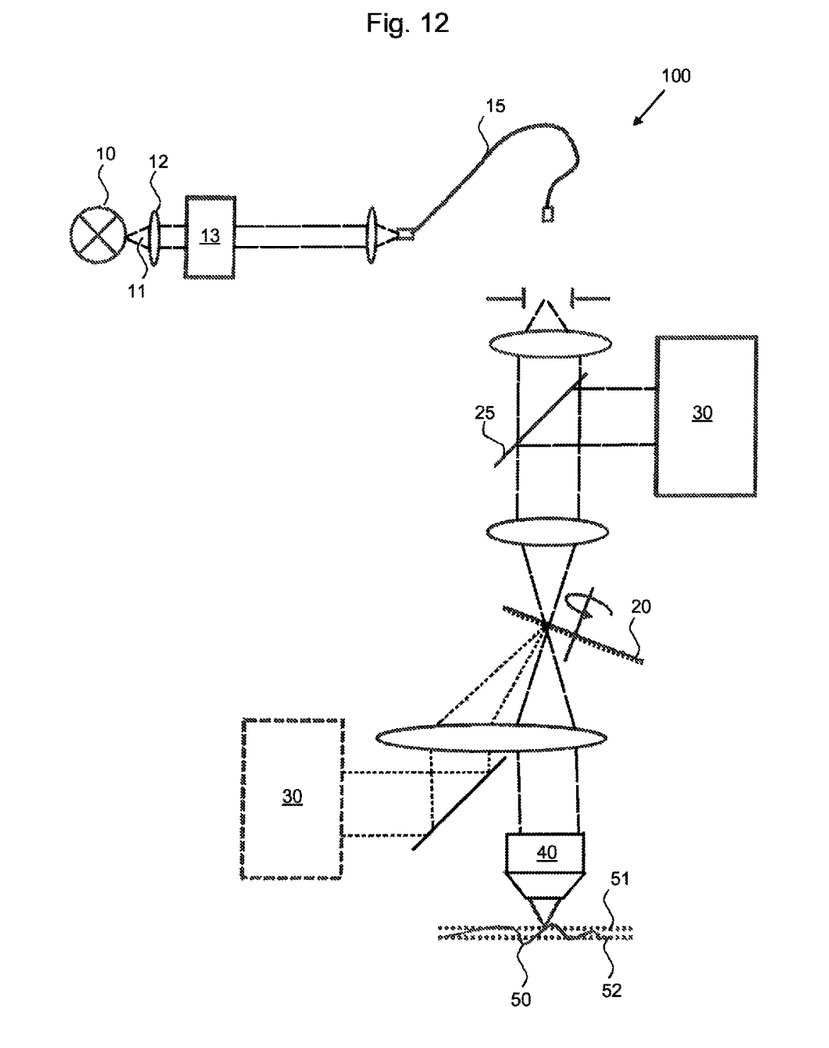
FIG. 12 shows a second embodiment of a light microscope according to the invention.

A further embodiment is shown in FIG. 12. This differs from the embodiment described above in particular by an illuminating structure 20 not being arranged—as in FIG. 11—before the beam splitting means 25, but instead between the beam splitting means 25 and the objective 40. The illuminating structure 20 has forwarding regions for forwarding light between the objective 40 and the beam splitting means 25. The illuminating structure can be laterally moved, in particular being rotated, so that the position of the forwarding regions is changed.

The forwarding regions, or light guiding regions provided on a further element, are larger than corresponding to the optical resolution at this point in the optical path. That is to say: a point of the specimen plane is imaged onto a surface on the illuminating structure 20 which is smaller than one of the aforementioned regions. This corresponds to an incomplete confocal filtering. The fact that not only specimen light from confocal specimen regions is guided to the detector unit 30 is important for the determination of height information, as also shown in FIGS. 7 to 10.

Optionally, the illuminating structure 20 can be mirrored towards the objective 40 so that specimen light can be partially reflected there and detected with a second detector unit 30. In this case a mirrored surface of the illuminating structure 20 is preferably not perpendicular, but instead inclined, relative to an optical axis, along which specimen light 55 passes to reach the illuminating structure 20.

The illuminating structure 20 can also be designed so that, depending upon the rotation position, a free region of the illuminating structure 20 is brought into the optical path. The illuminating and specimen light is not thereby spatially filtered.

Figure 13:
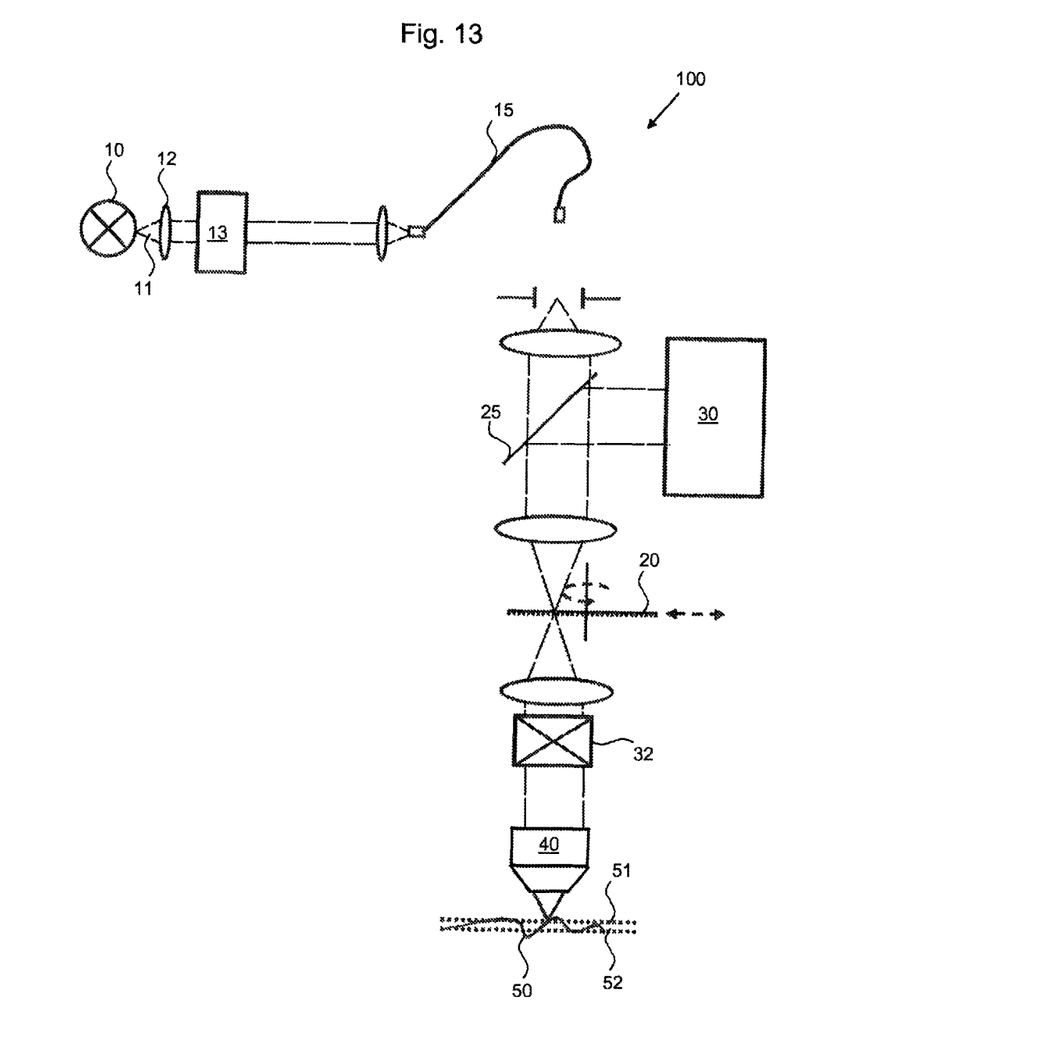
FIG. 13 shows a third embodiment of a light microscope according to the invention.

A further embodiment is shown in FIG. 13. Here, an illuminating structure 20 is located between the objective 40 and the beam splitting means 25 and brings about a truly confocal detection. The illuminating structure can be laterally moved and can be formed for example by a rotatable Nipkow disc.

A fixed illuminating structure 20 can be used if a scanner unit 32 is arranged between the illuminating structure 20 and the specimen 50.

Figure 14:
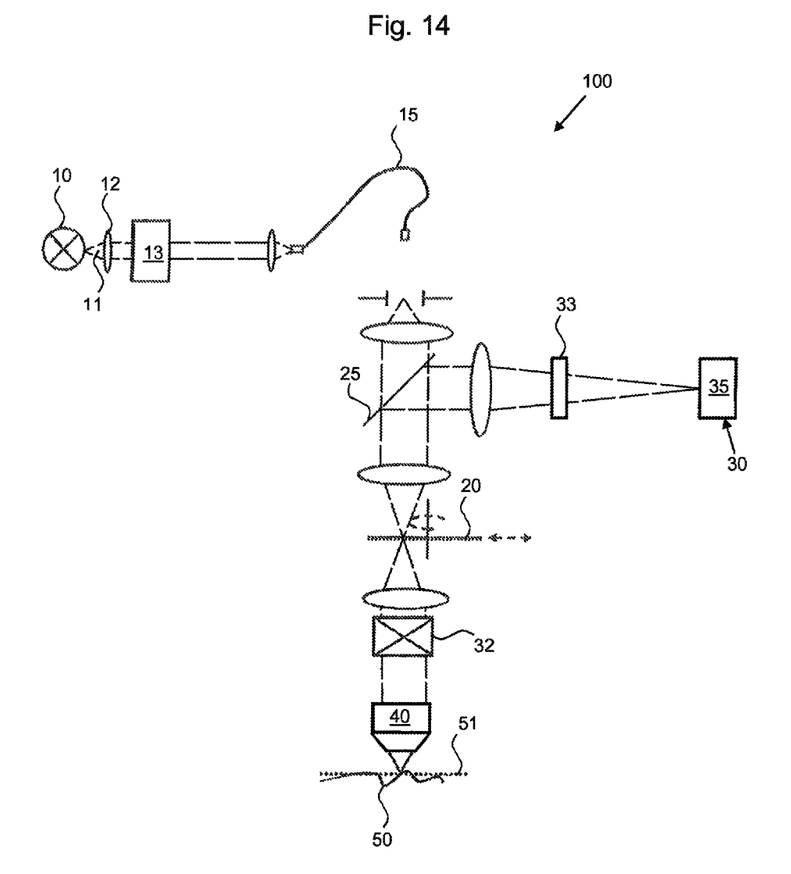
FIG. 14 shows a fourth embodiment of a light microscope according to the invention.

FIG. 14 shows a further embodiment. An optical element 33 is additionally arranged between the beam splitting means 25 and the detector unit 30, said optical element 33 having a point imaging function with which a form or shape, in which a lateral region of the specimen is imaged onto the detector unit, is dependent upon the height of the respective lateral region.

The optical element 33 can be an anamorphic optical element. This refracts a bundle of rays into two directions perpendicular to each other with differing strength. An example thereof is a cylindrical lens.

Alternatively, the optical element 33 can also be a so-called phase plate which comprises a helical point imaging function.

The detector unit can also be formed by a single camera here.

It is also possible to arrange such an optical element 33 in the illumination optical path instead of in the detection optical path. The point imaging function, with which a point of a light source is imaged onto a lateral region of the specimen, is thus dependent upon the height of the respective lateral region.

The described illuminating structures 20 of FIGS. 11 to 14 can also comprise at least two different types of microlenses which have different focal lengths. The specimen 50 is scanned with each type of microlens and at least two specimen images are thus recorded for different height planes. In this case, the detector unit 30 can comprise a single camera. The two specimen images recorded correspond extensively to the two specimen images which are recorded in the embodiments of FIGS. 7 to 10.

Furthermore it is also possible to provide a respective illuminating structure 20 in the illumination optical path and in the detection optical path, wherein these two illuminating structures 20 are different from each other, for example with respect to the size of their guiding regions for light.

Through each of the embodiments described, precise specimen recordings covering a respective height measurement range can be produced with simple means. The specimen recordings can advantageously be brought together without cost-intensive position measuring equipment or adjusting elements being necessary.

LIST OF REFERENCE SIGNS

1, 2, 3 Response functions of different specimen points
4, 5 Height measurement ranges 10 Light source device
11 Illuminating light
12 Optical element
13 Wavelength filter
14 Switching element
15, 16 Different optical paths
20 Illuminating structure
21 Switching element for guiding illuminating light onto the illuminating structure
25 Beam splitting means
30 Detector unit
32 Scanner unit
33 Anamorphic optical element
35, 36 Cameras of the detector unit
37, 38 Image planes
39 Beam splitting means, diffractive element
40 Objective
50 Specimen, specimen surface
51, 52 Specimen or height planes
55 Specimen light
100 Light microscope

What is claimed is:

1. A microscopy method for examining a microscopic specimen,
wherein illuminating light is emitted with a light source device to the specimen,
wherein specimen light coming from the specimen is guided with optical imaging means to a detector unit,
wherein the specimen light is measured with the detector unit to produce specimen recordings,
wherein height information for a respective plurality of lateral regions of the specimen is obtained from each specimen recording,
wherein the height information of each specimen recording is limited to a respective height measurement range and the height measurement ranges of different specimen recordings are different from each other, and
wherein an overall image is calculated from the specimen recordings, in which height information of the different specimen recordings is brought together,
wherein
specimen recordings are recorded at such heights that the height measurement ranges of different specimen recordings overlap each other,
common lateral regions are identified in two respective specimen recordings, for which common lateral regions height information could be obtained in both specimen recordings, and
a link between the height information of different specimen recordings is determined on the basis of the height information of different specimen recordings for at least one common lateral region,
wherein
the lateral regions, of which the heights lie within the respective height measurement range, are determined and selected for each specimen recording, and
only the height information of these selected lateral regions is used to calculate the overall image.

2. The microscopy method as defined in claim 1, wherein
one and the same height value is assigned to each of these common lateral regions of two specimen recordings.

3. The microscopy method as defined in claim 1, wherein
a height offset between the height measurement ranges of two specimen recordings is calculated to link the height information of these two specimen recordings by calculating a difference between the height information of these specimen recordings for a common lateral region and displacing the height information of one of these two specimen recordings by the height offset.

4. The microscopy method as defined in claim 1, wherein
in a case in which a plurality of common lateral regions are identified in two specimen recordings, the height information of all the common lateral regions is used to determine the link of the height information of remaining lateral regions, for which height information could be obtained only in one of the two specimen recordings.

5. The microscopy method as defined in claim 1, wherein
when using the height information of a plurality of common lateral regions to determine the link of the height information, the height information for the plurality of common lateral regions is differently weighted.

6. The microscopy method as defined in claim 1, wherein
the height information of one of the lateral regions is fixed as a reference point in each specimen recording,
the height information obtained in a specimen recording for the different lateral regions is expressed as relative heights with respect to the reference point of this specimen recording,
for at least one of the common lateral regions in two specimen recordings, a difference between the two relative heights determined for this lateral region in the two specimen recordings is determined,
a height offset is determined with the determined difference, and
in order to link the height information of the two specimen recordings, the relative heights of one of these specimen recordings are changed by the height offset.

7. The microscopy method as defined in claim 1, wherein
for each specimen recording there is a respective specimen height range, from which specimen light is guided onto the detector unit,
the specimen recordings are recorded during a height scan in which the height range for each specimen recording is altered.

8. The microscopy method as defined in claim 1, wherein
the height information is obtained from a specimen recording through at least one of the following steps:
an intensity determination, wherein height information for a lateral region is derived from a measured light intensity for this lateral region,
a sharpness determination, wherein height information for a lateral region is derived from a determined image sharpness for this lateral region.

9. The microscopy method as defined in claim 1, wherein
a chromatic confocal specimen examination or a white light interferometry is carried out, in which focal planes of illuminating light are wavelength-dependent, to produce a specimen recording, from which height information can be obtained.

10. A light microscope for examining a microscopic specimen, having
a light source device to emit illuminating light to the specimen,
optical imaging means to guide illuminating light to the specimen and to guide specimen light coming from the specimen, a detector unit to measure the specimen light to produce a plurality of specimen recordings, electronic control and evaluation means designed to obtain height information for a respective plurality of lateral regions of the specimen from each specimen recording, wherein the height information of each specimen recording is limited to a respective height measurement range, and the height measurement ranges of different specimen recordings are different from each other, and wherein the electronic control and evaluation means are additionally designed to calculate an overall image from the specimen recordings, in which overall image height information of the different specimen recordings is brought together, wherein the electronic control and evaluation means are adapted:

to record specimen recordings at such heights that the height measurement ranges of different specimen recordings overlap each other, to identify common lateral regions in two respective specimen recordings, for which common lateral regions height information is obtained in both specimen recordings, and to determine a link of the height information of different specimen recordings on the basis of the height information of different specimen recordings for at least one common lateral region, wherein the optical imaging means, the light source device and the detector unit are designed so that at least two specimen images can respectively be recorded for each specimen recording without mechanical movement of the specimen, the optical imaging means or the detector unit, wherein for the recording of the two specimen images it is provided for at least one of:

at least two light spot patterns are focussed with the light source device and the optical imaging means into different specimen planes, images of at least two different specimen planes are produced and separately measured with the optical imaging means and the detector unit.

11. The light microscope as defined in claim 10,
wherein beam splitting means are provided between the specimen and the detector unit, with which beam splitting means specimen light is divided across at least two spatially different detection optical paths, the detector unit comprises a respective detector region for each of the different detection optical paths, and different specimen planes are imaged onto the different detector regions.

12. The light microscope as defined in claim 11,
wherein the different detector regions are different portions of a shared camera of the detector unit.

13. The light microscope as defined in claim 10,
wherein the two light spot patterns which are focussed with the light source device and the optical imaging means into different specimen planes differ in a light property, the specimen light can be guided with beam splitting means onto different optical paths in dependence upon its light property, and a specimen image can be measured with the detector unit in each of the different optical paths.

14. The light microscope as defined in claim 10,
wherein the light source device comprises a first and a second light source unit to focus light spot patterns onto different specimen planes, wherein the first light source unit is arranged in a plane which is optically conjugated with a first specimen plane, and wherein the second light source unit is arranged in a plane which is optically conjugated with a second specimen plane.

15. A microscopy method for examining a microscopic specimen, wherein illuminating light is emitted with a light source device to the specimen, wherein specimen light coming from the specimen is guided with optical imaging means to a detector unit, wherein the specimen light is measured with the detector unit to produce specimen recordings, wherein height information for a respective plurality of lateral regions of the specimen is obtained from each specimen recording, wherein the height information of each specimen recording is limited to a respective height measurement range and the height measurement ranges of different specimen recordings are different from each other, and wherein an overall image is calculated from the specimen recordings, in which height information of the different specimen recordings is brought together, wherein specimen recordings are recorded at such heights that the height measurement ranges of different specimen recordings overlap each other, common lateral regions are identified in two respective specimen recordings, for which common lateral regions height information could be obtained in both specimen recordings, and a link between the height information of different specimen recordings is determined on the basis of the height information of different specimen recordings for at least one common lateral region, wherein optical imaging means are provided for encoding height information, said optical imaging means having such a point imaging function that a form, in which a point of the light source device is imaged onto a lateral region of the specimen, or in which a lateral region of the specimen is imaged onto the detector unit, is dependent upon the height of the respective lateral region, the respective form of the plurality of imaged lateral regions is determined in specimen recordings recorded with the detector unit, and height information of the respective lateral region is derived from the form.

16. The microscopy method as defined in claim 15,
wherein one and the same height value is assigned to each of these common lateral regions of two specimen recordings.

17. The microscopy method as defined in claim 15,
wherein a height offset between the height measurement ranges of two specimen recordings is calculated to link the height information of these two specimen recordings by calculating a difference between the height information of these specimen recordings for a common lateral region and displacing the height information of one of these two specimen recordings by the height offset.

18. The microscopy method as defined in claim 15, wherein the lateral regions, of which the heights lie within the respective height measurement range, are determined and selected for each specimen recording, and only the height information of these selected lateral regions is used to calculate the overall image.

19. The microscopy method as defined in claim 15, wherein in a case in which a plurality of common lateral regions are identified in two specimen recordings, the height information of all the common lateral regions is used to determine the link of the height information of remaining lateral regions, for which height information could be obtained only in one of the two specimen recordings.

20. The microscopy method as defined in claim 15, wherein when using the height information of a plurality of common lateral regions to determine the link of the height information, the height information for the plurality of common lateral regions is differently weighted.

* * * * *